(12) United States Patent
Ofek et al.

(10) Patent No.: US 9,594,960 B2
(45) Date of Patent: Mar. 14, 2017

(54) VISUALIZING VIDEO WITHIN EXISTING STILL IMAGES

(75) Inventors: Eyal Ofek, Redmond, WA (US); Billy Chen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1043 days.

(21) Appl. No.: 12/881,704

(22) Filed: Sep. 14, 2010

(65) Prior Publication Data

US 2012/0062748 A1    Mar. 15, 2012

(51) Int. Cl.
G06K 1/04      (2006.01)
G06K 9/00      (2006.01)
G08G 1/04      (2006.01)

(52) U.S. Cl.
CPC ............ *G06K 9/00771* (2013.01); *G08G 1/04* (2013.01)

(58) Field of Classification Search
CPC .............................. G08G 1/04; G06K 9/00771
USPC ......................................................... 348/149
See application file for complete search history.

(56) References Cited

U.S. PATENT DOCUMENTS

| | | | |
|---|---|---|---|
| 5,611,033 A | 3/1997 | Pitteloud et al. | |
| 6,075,905 A | 6/2000 | Herman et al. | |
| 6,476,855 B1 | 11/2002 | Yamamoto | |
| 8,175,444 B2 | 5/2012 | Kang et al. | |
| 8,237,791 B2 | 8/2012 | Chen et al. | |
| 2003/0103647 A1 | 6/2003 | Rui et al. | |
| 2004/0189793 A1 | 9/2004 | Wang et al. | |
| 2004/0257384 A1 | 12/2004 | Park et al. | |
| 2005/0033505 A1* | 2/2005 | Zatz .............................. 701/117 | |
| 2005/0275723 A1* | 12/2005 | Sablak ............... G06K 9/00771 348/169 | |

(Continued)

FOREIGN PATENT DOCUMENTS

JP      2004-214830 A      7/2004

OTHER PUBLICATIONS

Wagner, et al., "Real-Time Panoramic Mapping and Tracking on Mobile Phones", Retrieved at << http://www.icg.tu-graz.ac.at/Members/daniel/Publications/VR2010_PanoMT.pdf/at_download/file >>, Virtual Reality Conference (VR), Mar. 20-24, 2010, pp. 8.

(Continued)

*Primary Examiner* — William C Vaughn, Jr.
*Assistant Examiner* — Jerry Jean Baptiste
(74) *Attorney, Agent, or Firm* — Steven Spellman; Tom Wong; Micky Minhas

(57) ABSTRACT

Video from a video camera can be integrated into a still image, with which it shares common elements, to provide greater context and understandability. Pre-processing can derive transformation parameters for transforming and aligning the video to be integrated into the still image in a visually fluid manner. The transformation parameters can then be utilized to transform and align the video in real-time and display it within the still image. Pre-processing can comprise stabilization of video, if the video camera is moveable, and can comprise identification of areas of motion and of static elements. Transformation parameters can be derived by fitting the static elements of the video to portions of one or more existing images. Display of the video in real-time in the still image can include display of the entire transformed and aligned video image, or of only selected sections, to provide for a smoother visual integration.

20 Claims, 6 Drawing Sheets

(56) References Cited

U.S. PATENT DOCUMENTS

| | | |
|---|---|---|
| 2005/0280700 A1 | 12/2005 | Rui et al. |
| 2006/0203098 A1* | 9/2006 | Henninger, III ... G06K 9/00771 348/211.99 |
| 2007/0070069 A1* | 3/2007 | Samarasekera ......... G06F 3/011 345/427 |
| 2007/0085913 A1 | 4/2007 | Ketelaars et al. |
| 2007/0092113 A1* | 4/2007 | Yonaha .............. G06K 9/00013 382/115 |
| 2007/0110338 A1* | 5/2007 | Snavely et al. ............... 382/305 |
| 2007/0122058 A1* | 5/2007 | Kitaura et al. ................ 382/284 |
| 2008/0095403 A1* | 4/2008 | Benhammou ................ 382/104 |
| 2008/0307311 A1 | 12/2008 | Eyal |
| 2009/0022422 A1 | 1/2009 | Sorek et al. |
| 2009/0027418 A1* | 1/2009 | Maru et al. .................... 345/629 |
| 2009/0030643 A1* | 1/2009 | White ................ G06K 9/00771 702/127 |
| 2009/0122195 A1* | 5/2009 | van Baar .................. G06T 3/40 348/584 |
| 2009/0208080 A1 | 8/2009 | Grau et al. |
| 2009/0213234 A1 | 8/2009 | Chen et al. |
| 2009/0237510 A1 | 9/2009 | Chen et al. |
| 2009/0290028 A1 | 11/2009 | Yamasaki |
| 2009/0322915 A1 | 12/2009 | Cutler |
| 2010/0039447 A1* | 2/2010 | Nakao .................... H04N 1/387 345/634 |
| 2010/0104199 A1* | 4/2010 | Zhang et al. ................. 382/199 |
| 2010/0158321 A1* | 6/2010 | Shah et al. .................... 382/107 |

OTHER PUBLICATIONS

Zask, et al., "Rapid 3D Visualization of Indoor Scenes Using 3D Occupancy Grid Isosurfaces", Retrieved at << http://www.cs.ait.ac.th/~mdailey/papers/Zask-3D.pdf >>, Electrical Engineering/Electronics, Computer, Telecommunications and Information Technology, 6th International Conference on, vol. 2, May 6-9, 2009, pp. 4.
Kogut, et al., "A Semi-Autonomous Weapon Payload", Retrieved at << http://citeseerx.ist.psu.edu/viewdoc/download?doi=10.1.1.65.7841&rep=rep1&type=pdf >>, 2005, pp. 12.
Zhu, et al., "Fast Construction of Dynamic and Multi-Resolution 360° Panorama from Video Sequences", Retrieved at << ftp://ftp.cs.umass.edu/pub/techrept/techreport/1999/UM-CS-1999-010.ps >>,Technical Report TR #99-10, Feb. 1999, pp. 28.
Wettergreen, et al., "Operating Nomad during the Atacama Desert Trek", Retrieved at << http://swing.adm.ri.cmu.edu/pub_files/pub4/wettergreen_david_1997_1/wettergreen_david_1997_1.pdf >>, International Conference on Field and Service Robotics, Dec. 1997, pp. 8.
"International Search Report", Mailed Date: Feb. 22, 2012, Application No. PCT/US2011/047956, Filed Date: Aug. 16, 2011, pp. 8.
"Office Action Issued in Japanese Patent Application No. 2013-529158", Mailed Date: Jun. 9, 2015, 11 Pages.
Tan, et al., "A Video-Based Real-Time Vehicle Detection Method by Classified Background Learning", In Journal on World Transactions on Engineering and Technology Education, vol. 6, Issue 1, Dec. 31, 2007, pp. 189-192.
"Office Action and Search Report Issued in Taiwan Patent Application No. 100128565", Mailed Date: Dec. 15, 2015, 6 Pages.

* cited by examiner

VISUALIZING VIDEO WITHIN EXISTING STILL IMAGES

BACKGROUND

With a few exceptions, such as those whose profession it is to operate motor vehicles, the time spent driving is generally regarded by most individuals as unproductive time. Such unproductivity can be made worse by the aggravation and other emotional toll experienced by drivers who are stuck in high-volume traffic situations. As such, it has long been desirable to avoid high-volume traffic situations while driving. Such desirability has been met with a myriad of traffic information available to individuals to aid them in avoiding high-volume traffic situations, or other traffic-based incidences that they wish to avoid. For example, many automobile navigational systems now provide some measure of real-time traffic information. Similarly, as another example, many network-based mapping applications likewise provide real-time traffic information.

Often, the traffic information that is provided is generalized for easier consumption. For example, traffic information is often provided utilizing the ubiquitous red, yellow and green color coding, where green color is utilized to indicate a low-volume traffic situation while red is utilized to indicate a high volume traffic situation. As another example, traffic information is also often provided in terms of average speed or amount of time taken to travel a predefined distance, such as between two well-known intersections or other such landmarks. While such generalized traffic information can be, indeed, easier for the user to consume, such as if the user is preoccupied with operating a motor vehicle, it can, in certain circumstances, simply not provide sufficient information.

For those circumstances in which more detailed traffic information may be desired, traffic information can also be provided in the form of real-time images of motor vehicle traffic in a particular location, typically through video cameras that are communicationally coupled to a larger network of computing devices, such as the ubiquitous Internet, or equally ubiquitous World Wide Web. Traditionally, such traffic cameras are maintained by governmental agencies, such as a state or local Department of Transportation, and are mounted and positioned in such a manner to provide a vantage point in a particular direction of an important road or other thoroughfare. Typically, access to the images provided by such traffic cameras can be obtained through websites, or other like network-based interfaces, in the form of raw traffic camera image feeds. For example, a website can display a map with the positions of traffic cameras indicated via appropriate icons, or other indicators. Selection of such icons, or other indicators, can result in the presentation of the raw traffic camera image feed, often within a sub window or other like independent user interface element.

Due to cost and bandwidth considerations, typically, the traffic cameras utilized may not be able to provide high-quality images. Furthermore, traffic cameras are designed to provide images of motor vehicle traffic, and do not provide contextual, or surrounding images. Consequently, users often experience confusion when accessing traffic camera image feeds. For example, it is often difficult for users to determine in which direction a traffic camera is facing. Likewise, it is often difficult for users to identify exactly which roadway is being pictured, since the presentation of the traffic camera image feed, as a live, real-time, moving image presentation, is contextually vastly different from the displayed map from which the user selected the traffic camera, and which provided the iconic visual indicator of the traffic camera's location.

SUMMARY

In one embodiment, traffic camera image feeds are presented to users within the context of existing panoramas comprising the same roadway featured in the traffic camera image feed. Such an amalgamation can enable the viewing of the moving and dynamic traffic images provided by the traffic camera within the greater visual context of the existing panoramas. Existing panoramas have typically been captured through dedicated panorama cameras mounted on dedicated vehicles, and are typically presented to users through existing map-based websites or other like network-centric interfaces as a street-level view of a selected map area. Users' familiarity with such street-level views, combined with the contextual visual information provided by the panorama can enable users to more easily comprehend and utilize the moving and dynamic traffic camera image feed when presented within such a panorama.

In another embodiment, a traffic camera image feed can be preprocessed to determine transformation parameters applicable to the traffic camera image feed to improve its visual integration with the existing panorama. Such preprocessing can comprise identifying one or more appropriate panoramas within which to display the traffic camera image feed and can further comprise identifying those portions of the traffic camera image feed that change over time, and those portions that remain static over time.

In a further embodiment, a traffic camera image feed can be integrated into one or more existing panoramas, such that the moving and dynamic video from the traffic camera is presented within the greater visual context of the one or more panoramas, by transforming the entire traffic camera image feed in accordance with predetermined transformation parameters and then displaying it within existing panoramas. Alternatively, only the moving, or varying, components of the traffic camera image feed can be filtered and displayed within existing panoramas. As yet another alternative, the moving, or varying, components of the traffic camera image feed, in combination with the roadway, or other appropriate background structures, can be filtered and displayed within existing panoramas.

In a still further embodiment, line matching algorithms can be utilized to calculate transformation parameters. Such line matching algorithms can seek to match the lines of appropriate aspects of the static portion of the traffic camera image feed to like aspects of one or more existing panoramas.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
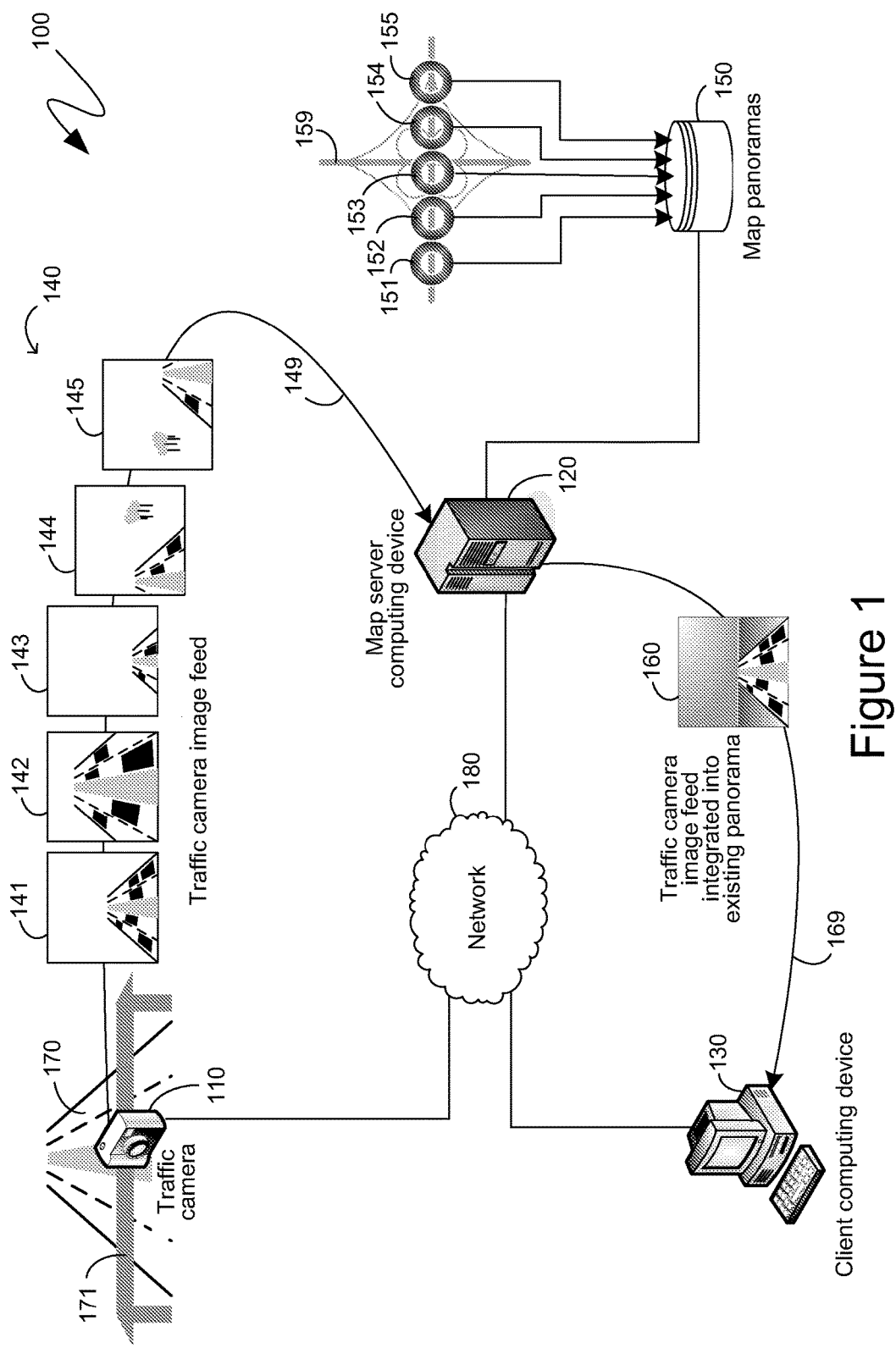
FIG. 1 is a block diagram of an exemplary system for integrating a traffic camera image feed into existing panoramas.

The following description relates to the integration of real-time video camera image data, referred to herein as a "feed", into existing images, typically within the form of panorama images so that the moving video sourced by the video camera is displayed within the greater image context of the existing images. Initially, preprocessing can be performed to derive transformation parameters that can be utilized to visually transform the video camera image feed such that it blends in, and fits with, one or more existing panorama images. Subsequently, the predetermined transformation parameters can be utilized to display the video camera image feed within one or more existing panorama images, such as through a user interface typically utilized by the user to access such panorama images. Within the context of vehicular traffic, the traffic camera image feed can be transformed and integrated into one or more existing panoramas as a whole, or only certain portions of the traffic camera image feed can be displayed within the panorama, such as only the moving vehicles, or, alternatively, such as only the moving vehicles and the underlying roadway. One mechanism for deriving transformation parameters can be with line matching algorithms that can match appropriate lines from the static portions of a video camera image feed to corresponding lines in one or more panorama images. Appropriate lines can be identified via the use of filtering techniques, such as by filtering based on the direction of motion, or filtering based on pre-existing superimposed map data.

For purposes of illustration, the techniques described herein are directed to traffic camera image feeds as presented within existing panorama images collected for, and presented within, the context of a street-level view in a networked map interface. Such references, however, are strictly exemplary and are not intended to limit the mechanisms described to the specific examples provided. Indeed, the techniques described are applicable to the integration of any video camera image feed comprising both moving and static portions with existing still images that provide greater context surrounding the one or more elements framed by the video camera image feed. Consequently, references below to a "traffic camera" are intended to be understood broadly to signify any video camera and references to a "panorama" are intended to be understood broadly to apply to any still image providing greater visual context, since the descriptions below are equally applicable to such broader concepts and are not, in any way, uniquely limited to only traffic cameras or panorama images.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary system 100 is shown, comprising a client computing device 130, a map server computing device 120, and a traffic camera 110, each communicationally coupled to one another through the network 180. For purposes of illustration, the traffic camera 110, in the exemplary system 100 of FIG. 1, is shown as being positioned on an overpass 171, over a roadway 170, such that the traffic camera 110 can provide images of vehicular traffic on the roadway 170. The traffic camera image feed 140, represented graphically in the system 100 of FIG. 1 by the individual images 141, 142, 143, 144 and 145, can be made available to one or more computing devices via communications through the network 180. In the example illustrated by the system 100 of FIG. 1, the map server computing device 120 can receive the traffic camera image feed 140 from the traffic camera 110, as illustrated by the communication 149.

To enable a user, such as a user of the client computing device 130, to receive the traffic camera image feed 140 in a more meaningful, and more easily understandable, context, the map server computing device 120 can combine the traffic camera image feed 140 with one or more existing map panoramas 150 to provide, to the client computing device 130, an amalgamated image 160 that can comprise the traffic camera image feed 140, or portions thereof, overlaid upon, and presented within the context of, one or more of the map panoramas 150. As will be recognized by those skilled in the art, the map panoramas 150 can comprise panorama images that are arranged and organized in such a manner that they can be presented to a user within a map-based context. For example, map information that is typically made available via the network 180, such as map centric websites, can comprise one or more interfaces that can present some form of a street-level view to users. Such a street-level view, typically, enables a user to visualize a particular location, such as one selected through more traditional map browsing techniques, as it would be seen while walking or driving down a selected thoroughfare. The map panoramas 150, as will be recognized by those skilled in the art, can be utilized to provide such a street-level view.

More specifically, the map panoramas 150 can be typically obtained by dedicated panoramic cameras mounted on dedicated panorama-capturing vehicles that drive along specific thoroughfares for which it is desirable to be able to present a street-level view to users. Thus, the map panoramas 150 comprise a series of panoramic images taken at successive points along such specific thoroughfares, and the street-level view that can be presented to users can be presented by successively displaying the panoramas, thereby enabling a user to simulate motion along the thoroughfare, while also enabling a user to simulate turning their head, or otherwise changing the direction of the view being presented. For purposes of illustrating such a series of panoramic images, an intersection 159 is shown in the system 100 of FIG. 1, as it would appear on a map, with a series of successive panoramic images 151, 152, 153, 154 and 155 taken at points along one of the thoroughfares of the intersection 159. The panoramas 151, 152, 153, 154 and 155, as well as other panoramas, can be part of the map panoramas 150 that can be communicationally coupled to the map server computing device 120.

For purposes of illustration and explanation, the intersection 159 can be equivalent to the intersection of the underlying roadway 170 and overlying overpass 171 on which the traffic camera 110 is mounted. Consequently, one or more of the panoramas 151, 152, 153, 154 and 155 can comprise, at least approximately, the scene captured by the traffic camera 110. As will be described in further detail below, the map server computing device 120 can identify one or more of the map panoramas 150 and can integrate the traffic camera image feed 140 into such a panorama to provide to the client computing device 130, as illustrated by the communication 169, an amalgamated image 160 such that a user of the client computing device 130 that is being presented a street-level view via the map panoramas 150 can, within that street-level view, also see the current condition, including the current traffic, on the roadway 170, as presented by the traffic camera 110 through the traffic camera image feed 140. Although difficult to illustrate, due to the static nature of the Figures, the amalgamated image 160 is meant to represent an amalgamated image that comprises a moving and dynamic video, such as that provided by the traffic camera 110 in the form of the traffic camera image feed 140, overlaid over, or otherwise integrated with, an existing image in such a manner that the existing image provides a greater visual context for the moving and dynamic video and such that the video is displayed, in moving and dynamic form, within the existing image. By presenting the traffic camera image feed 140 within the context of existing panoramas, the user can be provided with substantially greater visual context within which to understand and comprehend the traffic camera image feed 140.

Additionally, as can be seen from the individual images 141, 142, 143, 144 and 145, the traffic camera 110 can, in one embodiment, be movable such that coverage captured by the camera can vary over time. For example, the image 142 can represent the traffic camera 110 having been panned downward since the capturing of the image 141. Similarly, image 143 can represent the traffic camera 110 being panned upward since the capturing of the image 142, and, indeed, since the capturing of the image 141. Likewise, images 144 and 145 can represent the traffic camera 110 being panned to the right, and the left, respectively since the capturing of the image 141. As will be explained in further detail below, processing performed by the map server computing device 120 can account for such changes in the orientation of the traffic camera 110.

Figure 2:
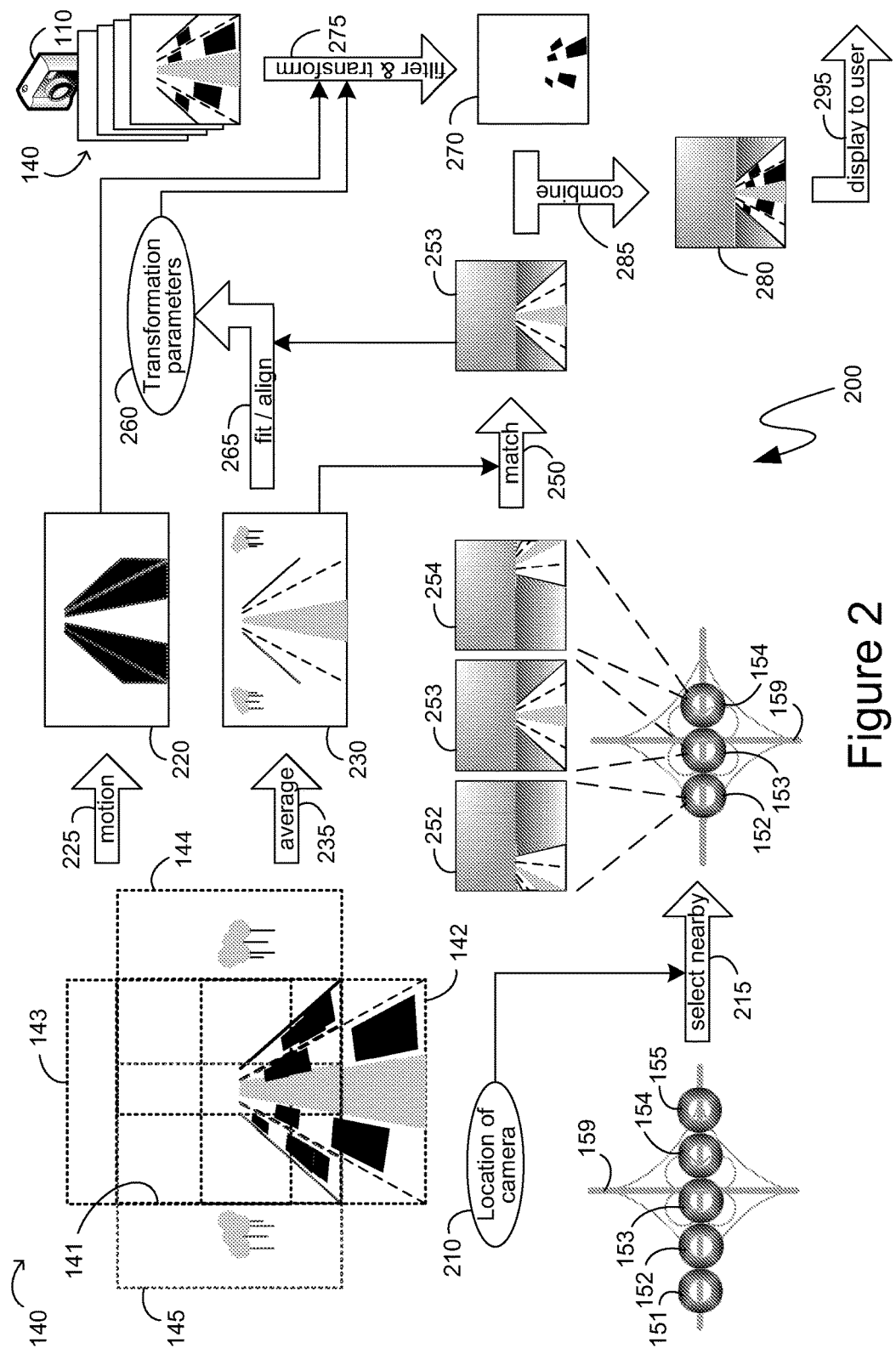
FIG. 2 is a block diagram of an exemplary mechanism combining a traffic camera image feed into an existing panorama.

Turning to FIG. 2, the system 200 illustrates, in greater detail, the processing by which a video camera feed can be integrated with existing panorama such that the video camera feed is displayed, in a moving and dynamic form, within the visual context of the existing panorama. Initially, such as during a preprocessing stage, the traffic camera image feed 140 can be sampled for a finite amount of time, such as an amount of time that can be established in advance, or an amount of time required to obtain a sufficient amount of visual information from the traffic camera image feed. In one embodiment, such a predetermined amount of time can take into account natural lighting factors such that, for example, the predetermined amount of time can be selected to avoid including both daytime and nighttime images, or, as another example, the predetermined amount of time can be selected to avoid including both morning and evening images. If the traffic camera image feed 140 that is being sampled indicates that the traffic camera from which such a traffic camera image feed is being received is capable of being moved, such that the coverage captured by the camera can vary over time, then, in one embodiment, an initial image stabilization can first be performed, such as is illustrated by the system 200 of FIG. 2. More specifically, as shown in FIG. 2, a sequence of images that each comprise varying coverage, such as the images 141, 142, 143, 144 and 145, which were shown individually in the system 100 of FIG. 1, can be aligned so that common elements of each image overlap. The resulting composite can then be utilized, with subsequent movements of the source video camera simply being regarded as subsequent captures of different portions of the composite.

From such a composite, one analysis, indicated by the action 225, can identify the areas of the composite that exhibited motion over the predetermined amount of time during which the image feed was sampled. The areas that indicated motion can be identified in the form of a motion mask 220, utilizing existing image analysis techniques well known to those skilled in the art. Similarly, from the composite, another analysis, indicated by the action 235, can identify the areas of the composite that remained static, or constant, over the predetermined amount of time during which the image feed was sampled. Again, existing image analysis techniques well known to those skilled in the art can be utilized to identify such areas. For example, one such technique can average images from the traffic camera image feed 140 over some or all of the predetermined amount of time during which the image feed is being sampled. Such an averaging can reduce, or practically eliminate, elements that were moving through the various image frames, while emphasizing those elements that remain static. The resulting average image 230 can comprise those portions of the images that are part of the traffic camera image feed 140, that do not change over time.

Together with the traffic camera image feed 140, information regarding the location 210 of the traffic camera 110 can be obtained to facilitate the selection of one or more potential panorama images. More specifically, as shown in the system 200 of FIG. 2, the location 210 of the camera can be compared, as indicated by the action 215, to the locations over one or more panoramas, such as the panoramas 151, 152, 153, 154 and 155. As will be recognized by those skilled in the art, when such panorama images are first collected their exact location can likewise be recorded, so that the panoramas may be appropriately displayed and integrated with existing maps, such as, for example, as part of a street-level view being provided in conjunction with the provision of such maps. Consequently, a comparison between the location 210 of the traffic camera 110 and the locations at which one or more of the panoramas were taken can be made in a straightforward manner.

The action 215 can represent the selection of candidate panoramas, from among an existing set of panoramas, that can be informed by, among other factors, the above-referenced location metadata. For example, in one embodiment, all panoramas that can have been taken within a predetermined distance from the location 210 of the traffic camera 110 can be selected to be candidate panoramas. In an alternative embodiment, panoramas that can have been taken along an appropriate thoroughfare can be selected to be candidate panoramas. In yet another alternative embodiment, the selection of candidate panoramas can be informed by multiple factors, such as topography, line of sight, or other factors by which panoramas that are likely to comprise, at least in a portion of the panorama, a similar image scope to that captured by the traffic camera 110 providing the traffic camera image feed 140. In the exemplary system 200 shown in FIG. 2, for purposes of illustration and explanation, the panoramas 152, 153 and 154 can be selected by the action 215 to be candidate panoramas based, at least in part, on the location 210 of the traffic camera 110 which, along with a collection of panoramas, is provided as input to the action 215.

Once a set of candidate panoramas has been selected, an appropriate portion of one or more of the candidate panoramas can be matched with the image scope being provided by the traffic camera image feed 140. In one embodiment, the selection of an appropriate portion of one or more of the candidate panoramas can be informed by existing map data that can be associated with the candidate panoramas. For example, as will be recognized by those skilled in the art, the typical presentation of a street-level view, utilizing these panoramic images, can also comprise an overlay of computer-generated map image data, such as, for example, lines indicating particular roadways or other map-indicated elements. Such existing map data associated with the candidate panoramas can be utilized to inform the selection of an appropriate portion of one or more of the candidate panoramas that is to be matched with the image scope being provided by the traffic camera image feed 140. More specifically, the location 210 of the camera, together with other potentially available metadata, can indicate one or more thoroughfares along which the traffic camera 110 is oriented, and whose vehicular traffic is being captured by the traffic camera image feed 140. The existing map data that is associated with the candidate panoramas can then be referenced to identify those portions of the candidate panoramas that are oriented in a similar direction, or along the same thoroughfare.

In the exemplary system 200 shown in FIG. 2, portions 252, 253 and 254, of the candidate panoramas 152, 153 and 154, respectively, can be selected by, for example, referencing the map data, shown in the form of the intersection 159, that can be associated with the candidate panoramas. As indicated previously, the intersection 159 can be the intersection at which the traffic camera 110, providing the traffic camera image feed 140, can be located, such as, for example, as indicated by the location 210 of the camera. Thus, the portions to 252, 253 and 254, of the candidate panoramas 152, 153 and 154, respectively, can have been selected by selecting those portions of the candidate panoramas that are known to have been oriented, by reference to the map data, along an appropriate one of the roadways of the intersection 159.

A selected portion 253, from among the portions 252, 253 and 254, of the candidate panoramas 152, 153 and 154, respectively, can be obtained by matching, as indicated by the action 250, aspects of the portions of the candidate panoramas to the average image 230 that can have been generated from the traffic camera image feed 140 in the manner described previously. For example, in one embodiment, the matching action 250 can be performed by matching lines in the portions 252, 253 and 254 to equivalent lines in the average image 230. One mechanism for selecting lines to match can be to select those lines that are in the direction of motion, or, equivalently in the direction of the roadway. Thus, with respect to the average image 230, the lines from that image that can be selected for matching can be selected with reference to the motion mask 220. For example, the lines from the average image 230 that can be selected for matching can be those that are substantially parallel to, or encompassed within, the motion mask 220. Similarly, with respect to the portions 252, 253 and 254, of the candidate panoramas 152, 153 and 154, respectively, the lines to match from each portion can be selected with the reference to map data that is associated with each of the candidate panoramas. More specifically, the selected lines can be those that are substantially parallel to the direction of the roadway that is believed to be the roadway along which the traffic camera 110 is directed, such as would be indicated by overlaid map data associated with each of the candidate panoramas.

For each of the portions 252, 253 and 254, of the candidate panoramas 152, 153 and 154, respectively, the selected lines can be matched to the selected lines of the average image 230, and the selected portion 253 can be selected based on a determination of which lines matched the most accurately. Line matching algorithms are well known to those skilled in the art, and, thus, are not further described. However, the matching action 250 is not limited to line matching. In other embodiments, points, image segments, or data clusters can be utilized to match portions 252, 253 and 254, of the candidate panoramas 152, 153 and 154, respectively, to the average image 230. As utilized herein, the term "image feature matching" is meant to refer to such embodiments in the aggregate. Additionally, while the system 200 of FIG. 2 illustrates a selected portion 253 of only one panorama 153, in other embodiments, the below described derivation of transformation parameters 260 can be performed for multiple panoramas, such that the traffic camera image feed 140 could be integrated with multiple different panoramas, though, as will be recognized by those skilled in the art, different transformation parameters can be calculated and utilized for each such integration of the traffic camera image feed into a specific one of the multiple different panoramas.

Once a selected portion 253 of a panorama is selected, the average image 230 can be transformed and aligned to the selected portion to enable combination of the traffic camera image feed 140 with the panorama 153 from which the selected portion 253 was obtained. The result of such a transformation and alignment, as represented by the action 265, can be transformation parameters 260 that can subsequently, as will be described further below, be applied to the traffic camera image feed 140 in real-time to enable a current display from the traffic camera 110 within the context of an existing panorama, such as the panorama 153.

As in the case of the matching 250 described above, image feature matching can likewise be utilized as part of the transformation and alignment 265 to select optimal transformation parameters 260. In one embodiment, a homography can be utilized to perform the transformation and alignment 265. More specifically, lines from the average image 230 can be randomly selected and a homography can be utilized to transform the average image 230 such that the randomly selected lines match equivalent lines in the selected portion 253. Subsequently, the check can be made of how closely other, non-selected, lines fit between the transformed and aligned average image 230 and the selected portion 253. The closeness of the fit can be scored in a manner well known to those skilled in the art, and that score can be stored along with the transformation parameters that were utilized. Subsequently, the untransformed average image 230 can again be referenced to again randomly select a different set of lines and perform another homography to transform the average image 230 such that the new randomly selected lines match equivalent lines in the selected portion 253. The score of this transformation can then, again, be determined in the same manner as previously, and can be stored along with the transformation parameters utilized. Ultimately, the transformation parameters that can be selected as the final transformation parameters 260 can be those transformation parameters that resulted in the best score, evidencing the best fit between the transformed and aligned average image 230 and the selected portion 253. In other embodiments, fitting models other than homography can be utilized, such as affine mapping or full projection.

Once the transformation parameters 260 have been determined, they can be utilized to transform, in essentially real-time, the traffic camera image feed 140 being received from a traffic camera 110 and integrate that transformed image into existing map panoramas. More specifically, and as shown in the exemplary system 200 of FIG. 2, the traffic camera image feed 140, being received in real-time, can be filtered and transformed, as indicated by the action 275, based on the transformation parameters 260 in the motion mask 220. The motion mask 220 can be utilized to identify those portions of the traffic camera image feed 140 that are to be integrated into the existing map panoramas. Subsequently, once those portions have been identified, and the remainder of the traffic camera image feed 140 has been filtered out, the transformation parameters 260 can be applied to transform the remaining portions of the traffic camera image feed. The resulting filtered and transformed traffic camera image feed 270 can then be combined with an existing image, as described in further detail below. Again, given the static nature of the Figures, the filtered and transformed traffic camera image feed 270 is illustrated as a single graphical composition in FIG. 2, but, as before, the graphical composition that is identified by the reference numeral 270 is meant to represent the moving and dynamic video from the traffic camera 110, except now graphically transformed, such as on a frame-by-frame, or other basis that would be well known to those skilled in the art, in accordance with the transformations described above, and which will be further described in detail below.

The filtered and transformed traffic camera image feed 270 can then be combined, as indicated by the action 285, with the previously selected portion 253 of a map panorama 153. The combining 285 can be such that the image scope of the traffic camera image feed 140 is correctly positioned within the larger image scope of the map panorama 153, or, more precisely, such that image features of the traffic camera image feed are overlaid over equivalent image features of the map panorama 153. Such a combination can result in an amalgamated image 280 which includes a live, or essentially live, traffic camera image feed, as a moving and dynamic video, being displayed within a portion of a map panorama 280, which can then be displayed to the user, as indicated by the action 295. In such a manner, the user can be provided with greater context for the video being received from the traffic camera 110. For example, a user browsing a street-level view, such as could be presented through a map-based website, when that user browses past the intersection at which the traffic camera 110 is located, they can be presented, not only with the street-level view of such an intersection, but also with a real-time, or approximately real-time, image of the actual moving vehicular traffic superimposed on the image of the intersecting roadway. Similarly, as another example, a user seeking to view the traffic camera image feed 140 can be presented such a traffic camera image feed within the context of the existing map panoramas such that the user can interact with the panoramas and receive a better context for the moving and dynamic traffic camera video that is being shown, such as a better understanding of which road the traffic camera 110 is directed at and in which direction the camera is pointing.

Figure 3:
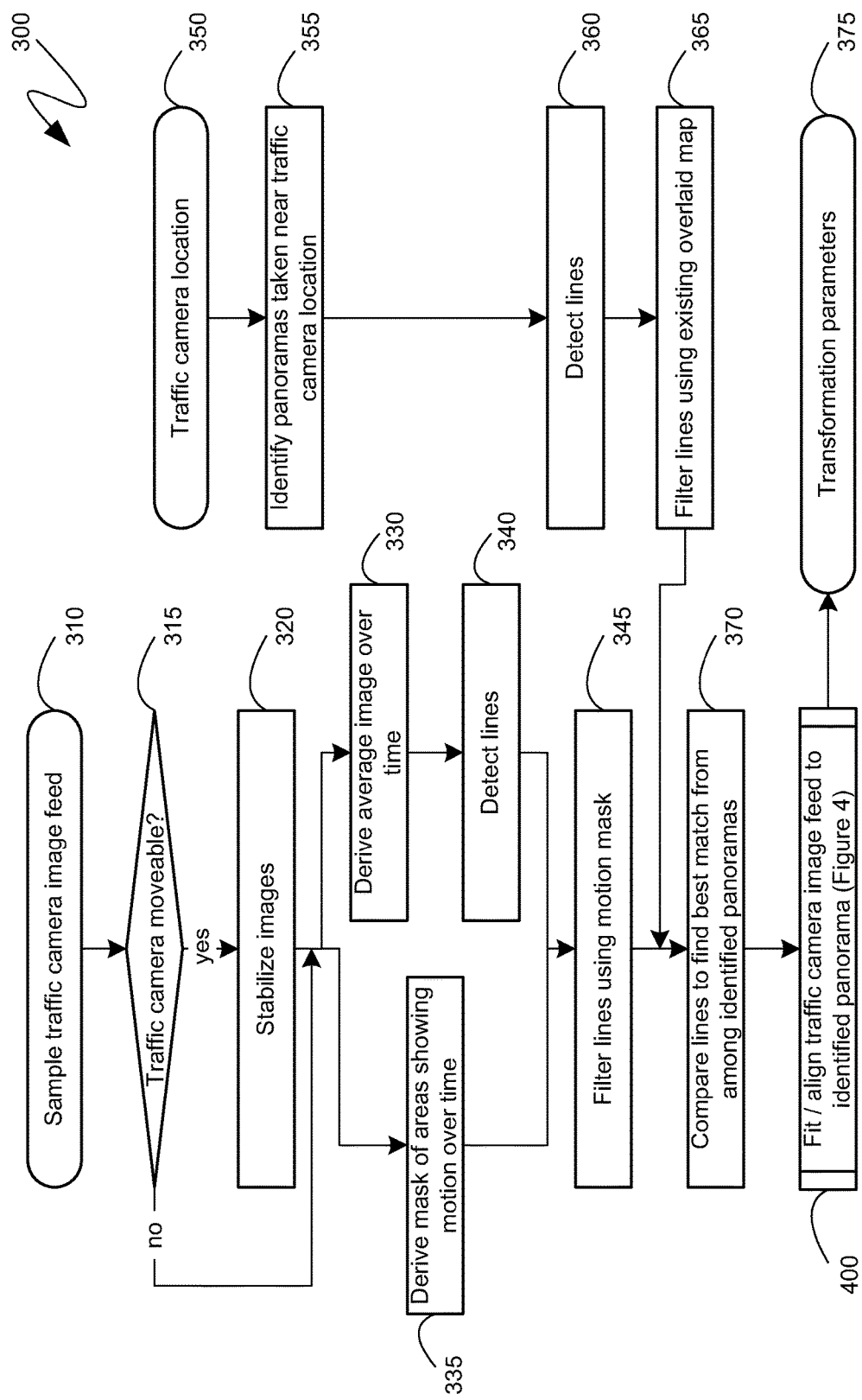
FIG. 3 is a flow diagram of an exemplary preprocessing of a traffic camera image feed for combination into an existing panorama.

Turning to FIG. 3, the flow diagram 300 shown therein illustrates an exemplary series of preprocessing steps that can be performed to derive the transformation parameters 260, shown previously in FIG. 2. Initially, as shown in FIG. 3, a traffic camera image feed can be sampled at step 310 and a traffic camera location can be obtained at step 350. As part of the sampling of the traffic camera image feed at step 310, a determination can be made, at step 315, as to whether the traffic camera, from which the traffic camera image feed is being sampled, is movable. The determination, at step 315, can be made, for example, by detecting whether the image scope changes among individual image frames of the traffic camera image feed. If, at step 315, it is determined that the traffic camera is not movable, then processing can proceed to steps 330 and 335. Alternatively, if, at step 315, it is determined that the traffic camera is movable, then processing can proceed to step 320, at which point the images being received from the traffic camera image feed can be stabilized, such as in the manner described previously. Processing can then proceed to steps 330 and 335.

As indicated in the flow diagram 300 of FIG. 3, the performance of the steps 330 and 340, and step 335, can be performed in parallel or in such a manner that the order of performance, as between steps 330 and 340, and step 335, can be irrelevant. At step 330, an average image can be derived over a period of time that includes at least some, if not all, of the time during which the traffic camera image feed is being sampled. Subsequently, at step 340, in one embodiment, lines in the average image derived at step 330, can be detected utilizing known line detection techniques. At step 335, a mask of areas that show motion over time can be derived from the traffic camera image feed being sampled.

Upon completion of the steps 330 and 340, and step 335, processing can proceed to step 345, at which point the lines that were detected at step 340, in the average image that was derived at step 330, can be filtered utilizing the motion mask derived at step 335, such that the resulting lines are those lines that are along, or approximately parallel to, the direction of motion, as identified by the motion mask.

In parallel with the above described steps, and independently of them, at step 355, panoramas that have been taken near the traffic camera location can be identified based on the traffic camera location that was received, or otherwise obtained, at step 350. Among the panoramas identified at step 355, lines can be detected in some portion of, or, indeed, all of the panorama, at step 360, via the utilization of known line detection techniques. Subsequently, at step 365, the lines detected at step 360 can be filtered based on existing map data that is integrated with, and associated with, the selected panoramas. More specifically, the line filtering performed at step 365 can select lines that are along, or in the direction of, one or more roadways that are identified as the roadway along which the traffic camera, providing the traffic camera image feed, is oriented.

Figure 4:
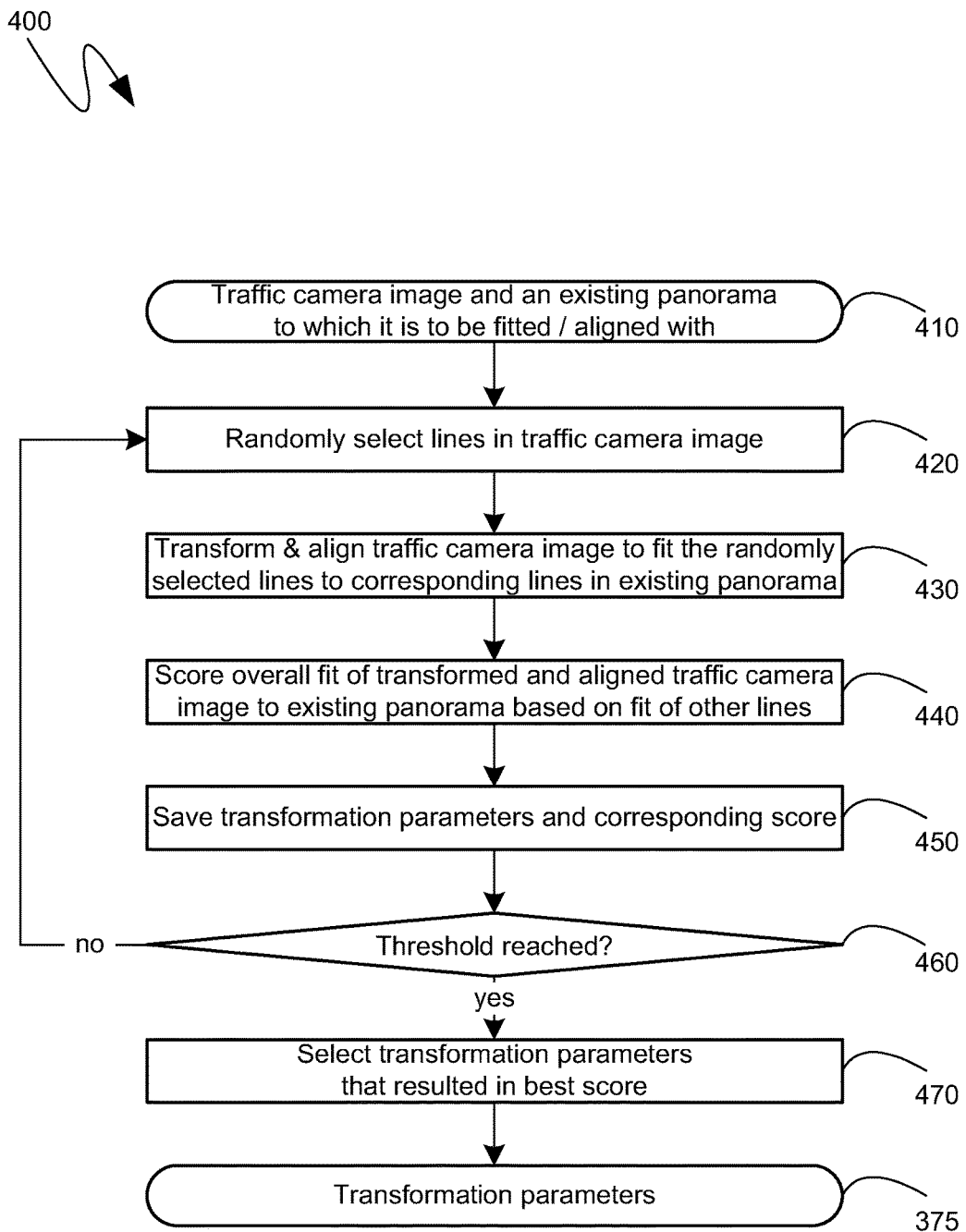
FIG. 4 is a flow diagram of an exemplary mechanism for matching a traffic camera image feed with an existing panorama.

At step 370, upon completion of the filtering of the lines at step 345, and the filtering of the lines at step 365, a comparison among the filtered lines can be made to identify a best match between the traffic camera image feed being sampled and at least some portion of one or more pre-existing map panoramas. Once a best match is identified, at step 370, the traffic camera image feed can be fit and aligned to the identified panorama, or portion thereof, such as via the system 400 that is shown in FIG. 4, and will be described in further detail below. Ultimately, irrespective of the exact mechanism utilized to perform the fitting and alignment of the traffic camera image feed to the identified panorama, or portion thereof, the result of such a mechanism can be transformation parameters, upon the derivation of which the relevant pre-processing can conclude at step 375 as shown in the flow diagram 300 of FIG. 3.

Turning to FIG. 4, the flow diagram 400 shown therein illustrates an exemplary mechanism by which the transformation parameters, that can be applied to a traffic camera image feed to enable it to be visually well integrated into an existing map panorama, can be derived. As indicated previously, while the flow diagram 400 of FIG. 4, and indeed aspects of the flow diagram 300 of FIG. 3, make reference to the utilization of lines to perform and evaluate matching between the traffic camera image feed and one or more existing map panoramas, such references are merely exemplary and other image features can likewise be utilized to perform such matching, and evaluation.

Initially, as shown by the flow diagram 400 of FIG. 4, a traffic camera image in an existing panorama to which it is to be fitted and aligned with, can be obtained at step 410. Subsequently, at step 420, lines in the traffic camera image can be randomly selected. As indicated previously, the collection of lines, from which some lines can be randomly selected in step 420, can be those lines identified by a motion mask, or otherwise lines that are along, or substantially parallel to, the direction of motion. Subsequently, at step 430, the traffic camera image can be transformed and aligned to fit the randomly selected lines to corresponding lines in the existing panorama. In one embodiment, homography can be utilized to perform such a transformation. At step 440, the overall fit between the transformed and aligned traffic camera image in the existing panorama can be scored, such as by evaluating how other lines match up between the transform to align the traffic camera image and the existing panorama. At step 450, the transformation parameters derived and utilized at step 430 can be saved together with the corresponding score that was determined at step 440.

At step 460, a determination can be made as to whether a threshold has been reached. In one embodiment, such a threshold can simply be a specific number of iterations, while, in other embodiments, such a threshold can be a minimum score associated with a threshold level of acceptability of the fit between the transformed and aligned traffic camera image and the existing panorama, or other like thresholds. If, at step 460, it is determined that an appropriate threshold has not yet been reached, processing can return to step 420, at which point a different set of lines can be randomly selected and the processing of steps 430, 440 and 450 can be repeated with the newly randomly selected lines. Conversely, if, at step 460, it is determined that the appropriate threshold has been reached, processing can proceed to step 470, at which point the transformation parameters that resulted in the best score can be selected. The selected transformation parameters at step 470 can be the goal of the relevant processing, as indicated by step 375, also referenced previously in the flow diagram 300 of FIG. 3.

Figure 5:
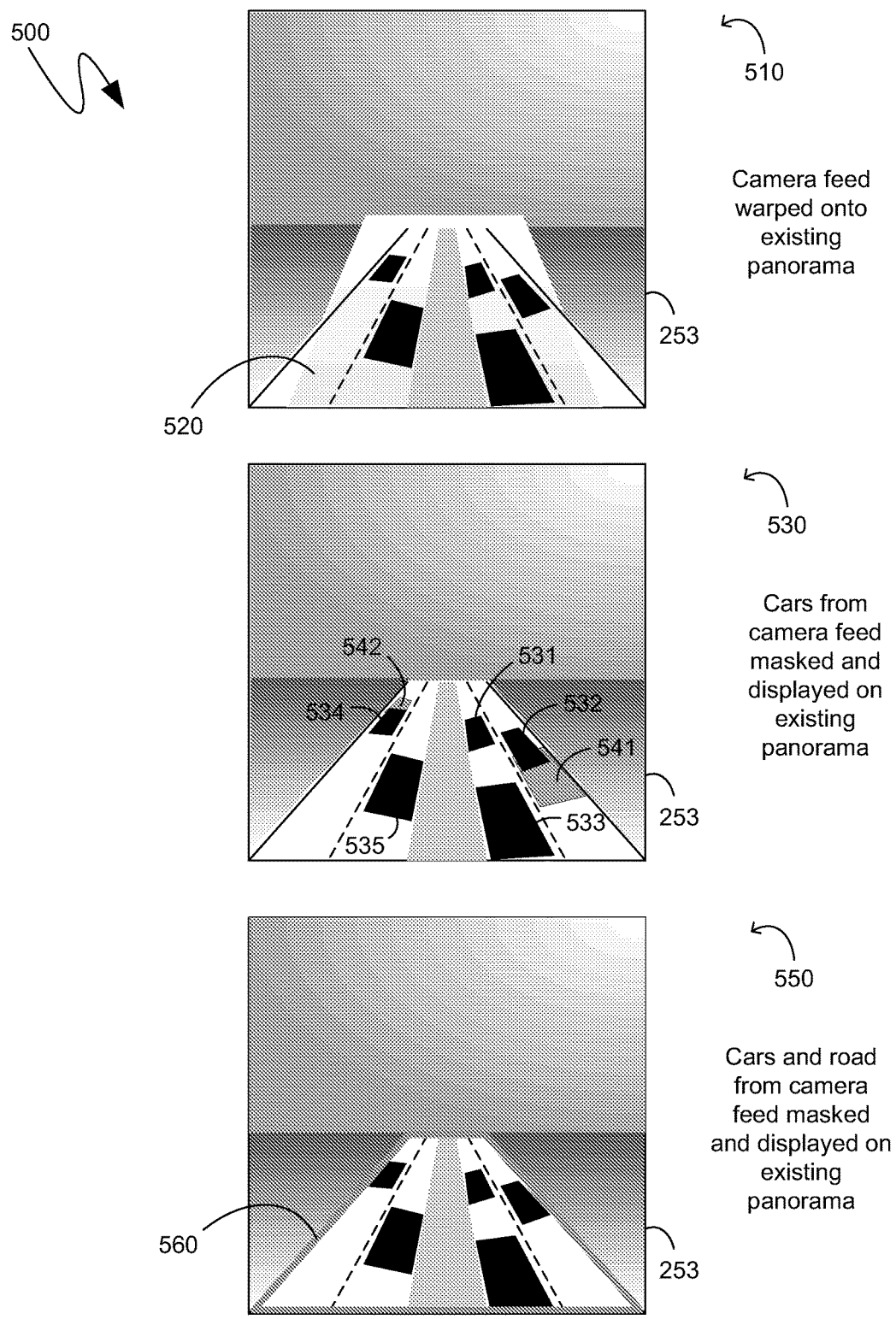
FIG. 5 is a block diagram of exemplary mechanisms for displaying a traffic camera image feed within an existing panorama.

Turning to FIG. 5, the block diagram 500 shown therein illustrates an exemplary set of composite images illustrating three mechanisms by which a traffic camera image feed can be integrated with existing panorama. As before, due to the static nature of the Figures, the amalgamations 510, 530 and 550 are shown as single graphical compositions, but they are intended to represent the superimposing, or other combining, of a moving and dynamic video that is displayed with a static image. Consequently, the various graphical elements within the video are intended to be understood and visualized by the reader as moving and dynamic graphical elements. Additionally, as will be recognized by those skilled in the art, the three mechanisms illustrated are merely exemplary and other visual integration mechanisms can be equally applied to a traffic camera image feed without departing from the descriptions provided herein. In one embodiment, illustrated by the amalgamated image 510, a selected portion 253 of a map panorama can have superimposed upon it a transformed and aligned moving traffic camera video, represented by the lightly shaded area 520. However, as will be recognized by those skilled in the art, such a presentation can lack visual finesse and can be perceived in a negative manner by certain users.

Consequently, in another embodiment, illustrated by the amalgamated image 530, a selected portion 253 of a map panorama can have superimposed on it only those elements of the moving traffic camera video that are believed to be vehicular traffic, such as the vehicles 531, 532, 533, 534 and 535. While such an embodiment can provide greater visual finesse, and retain the continuity of most of the panorama image, often panorama images may themselves include still images of vehicular traffic that may have been present on the roadway at the time its image was captured in the panorama. Thus, as shown in the composite image 530, vehicles 541 and 542 that can have been part of the panorama can appear to be occupying the same space, or approximately the same space, as the vehicles 531, 532, 533, 534 and 535 from the traffic camera image feed. Additionally, since the vehicles 531, 532, 533, 534 and 535 are moving elements of a moving and dynamic video, they can appear to drive "through" or "over the top of" the vehicles 541 and 542 that are static elements of the static panorama portion 253. Such an appearance, and such visual behavior, can be confusing to certain users.

Consequently, in yet another embodiment, illustrated by the composite image 550, a selected portion 253 of the map panorama can have superimposed upon it a portion 560 of the moving traffic camera video that comprises what is identified as the roadway and the vehicular traffic upon it. In such an embodiment, any vehicles that may have been part of the panorama can be masked when the roadway from the traffic camera image feed, with the moving vehicular traffic from that video, is superimposed over the top of them. Such an embodiment can, in certain circumstances, provide an approximately seamless visual integration between the meaningful visual information being provided by the traffic camera image feed, and the contextual visual information being provided by the panorama. For example, such an embodiment can make the moving vehicular traffic from the traffic camera video appear to be seamlessly moving within the portion of the panorama 253. However, as indicated previously, other mechanisms of integrating the two images can be utilized without departing from the scope of the above descriptions.

Additionally, as also indicated previously, the above descriptions are not specifically limited to traffic cameras and map panoramas, although references to such have been made for purposes of clarifying the above descriptions. Indeed, the above descriptions are applicable to any integration of a video into a still image. For example, various public and private entities maintain their own video cameras and provide access to the image feeds from such video cameras. Such entities can include ski resorts, whose video cameras can display current conditions on various ski slopes, public or private beaches, whose video cameras can display current beach conditions, and public or private universities, whose video cameras can simply display various portions of their campuses. The image feeds from such video cameras can be integrated into existing still images in the same manner as those from the traffic camera referenced above. For example, often ski slopes, beaches and university campuses are located near roads whose panoramas have been captured for purposes of providing street-level views within a mapping context. Thus, such other video cameras could have their moving and dynamic video integrated into the same map panoramas referenced above. As yet another alternative, narrow-field-of-vision video cameras, such as security cameras, could have their moving and dynamic video integrated into still images taken for the purpose of providing greater visual context for the narrow-field-of-vision security camera. Thus, as an example, a building can have wide-angle still images taken, each capturing at least two sides of such a building. Subsequently, all of the multitude of security cameras positioned around the building could have their video displayed within the context of such wide-field images. As can be seen, the above descriptions are applicable to a wide range of moving and dynamic video integrated into still images that provide greater visual context.

Figure 6:
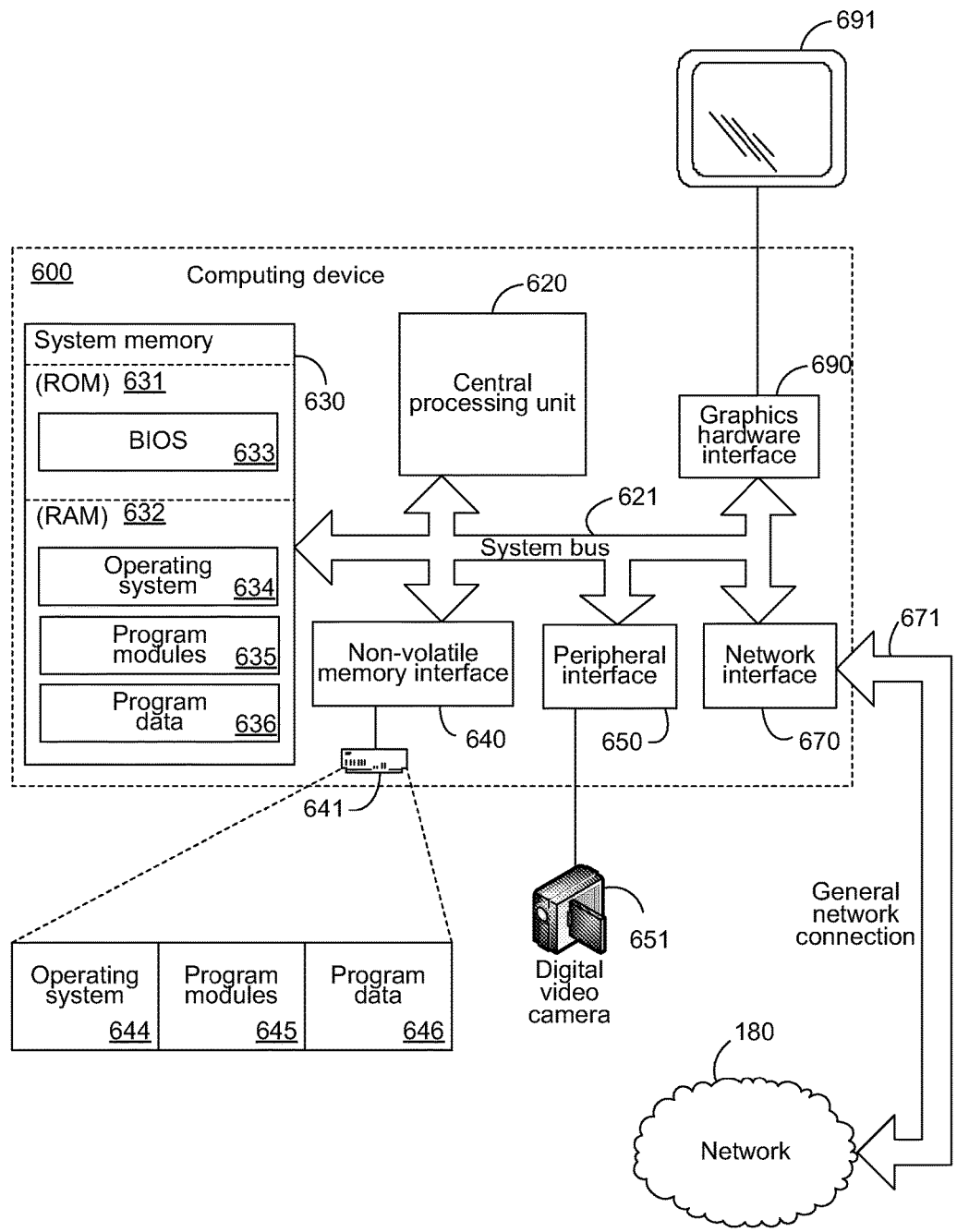
FIG. 6 is a block diagram of an exemplary computing device.

Turning to FIG. 6, an exemplary computing device 600 is illustrated upon which, and in conjunction with which, the above-described mechanisms can be implemented. The exemplary computing device 600 can be any one or more of the client computing device 130, the map server computing device 120 or even the traffic camera 110, illustrated in the previously referenced Figures and described in more detail above. The exemplary computing device 600 of FIG. 6 can include, but is not limited to, one or more central processing units (CPUs) 620, a system memory 630, that can include RAM 632, and a system bus 621 that couples various system components including the system memory to the processing unit 620. The system bus 621 may be any of several types of bus structures including a memory bus or memory controller, a peripheral bus, and a local bus using any of a variety of bus architectures. The computing device 600 can optionally include graphics hardware, such as for the display of visual user interfaces, including, but not limited to, a graphics hardware interface 690 and a display device 691. Additionally, the computing device 600 can also include graphics input hardware such as a digital video camera 651 which can represent the physical hardware by which the traffic camera 110 captures the traffic camera image feed 140. The graphics input hardware, such as the digital video camera 651, can be communicationally coupled to the system bus 621 via a peripheral interface 650.

The computing device 600 also typically includes computer readable media, which can include any available media that can be accessed by computing device 600 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 600. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and the aforementioned RAM 632. A basic input/output system 633 (BIOS), containing the basic routines that help to transfer information between elements within computing device 600, such as during start-up, is typically stored in ROM 631. RAM 632 typically contains data and/or program modules that are immediately accessible to and/or presently being operated on by processing unit 620. By way of example, and not limitation, FIG. 6 illustrates the operating system 634 along with other program modules 635, and program data 636.

The computing device 600 may also include other removable/non-removable, volatile/nonvolatile computer storage media. By way of example only, FIG. 6 illustrates the hard disk drive 641 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640.

The drives and their associated computer storage media discussed above and illustrated in FIG. 6, provide storage of computer readable instructions, data structures, program modules and other data for the computing device 600. In FIG. 6, for example, hard disk drive 641 is illustrated as storing operating system 644, other program modules 645, and program data 646. Note that these components can either be the same as or different from operating system 634, other program modules 635 and program data 636. Operating system 644, other program modules 645 and program data 646 are given different numbers hereto illustrate that, at a minimum, they are different copies.

The computing device 600 can operate in a networked environment using logical connections to one or more remote computers. The computing device 600 is illustrated as being connected to the general network connection 671 through a network interface or adapter 670 which is, in turn, connected to the system bus 621. In a networked environment, program modules depicted relative to the computing device 600, or portions or peripherals thereof, may be stored in the memory of one or more other computing devices that are communicatively coupled to the computing device 600 through the general network connection 671. It will be appreciated that the network connections shown are exemplary and other means of establishing a communications link between computing devices may be used.

As can be seen from the above descriptions, mechanisms for integrating live video camera feeds with existing static images have been enumerated. In view of the many possible variations of the subject matter described herein, we claim as our invention all such embodiments as may come within the scope of the following claims and equivalents thereto.

We claim:

1. A computing device comprising:
   one or more processing units; and
   one or more computer-readable storage media comprising computer-executable instructions which, when executed by the one or more processing units, cause the computing device to:
   obtain a sample of a video image feed;
   select one or more pre-existing still images whose image scope comprises at least a portion of an image scope of the obtained sample of the video image feed, the selecting being informed by location metadata associated with both the video image feed and the still images;
   derive an average image comprising those elements that remain static throughout the sample of the video image feed;
   derive a motion mask identifying areas in which elements move throughout the sample of the video image feed;
   identifying image features in the average image that are along the motion mask, having corresponding image features in the selected one or more still images; and
   derive transformation parameters to transform and align the video image feed such that the identified image features in the sample of the video image feed, after transformation and alignment, have a visual size and visual appearance equivalent to that of the corresponding image features in the selected one or more still images, and can be equivalently overlaid over the corresponding image features in the selected one or more still images.

2. The computing device of claim 1, wherein the video image feed is from a traffic camera and wherein further the pre-existing still images are panoramas providing a street-level view.

3. The computing device of claim 1, wherein the computer-executable instructions for identifying the image features in the video image feed comprise computer-executable instructions for identifying image features in the selected one or more still images that are along a roadway, associated with the selected one or more still images, along which a traffic camera is oriented, wherein the video image feed is from the traffic camera, and wherein the still images are panoramas.

4. The computing device of claim 1, wherein the computer-executable instructions for deriving the transformation parameters comprise computer-executable instructions for: selecting a first set of image features from among the identified image features in the sample of the video image feed; deriving preliminary transformation parameters; transforming and aligning the sample of the video image feed with the derived preliminary transformation parameters; scoring an overall fit between the transformed and aligned sample of the video image feed and the at least one of the selected still images, the scoring being based on an accuracy of alignment of others of the identified image features that are not part of the first set of image features; repeating the deriving and the scoring for subsequent sets of image features, selected from among the identified image features in the sample of the video image feed; and selecting, as the transformation parameters, those preliminary transformation parameters that yielded a best score of the overall fit.

5. The computing device of claim 1, wherein the identified image features are traffic lane marking lines and wherein further the computer-executable instructions for deriving the transformation parameters comprise computer-executable instructions for performing homography utilizing the traffic lane marking lines.

6. The computing device of claim 1, wherein the one or more computer-readable storage media comprise further computer-executable instructions, which, when executed by the one or more processing units, cause the computing device to: stabilize the sample of the video image feed into a composite with individual frames of the sample of the video image feed aligned with one another such that common image elements of each frame overlap.

7. The computing device of claim 1, wherein the one or more computer-readable storage media comprise further computer-executable instructions, which, when executed by the one or more processing units, cause the computing device to: transform and align the video image feed while it is being received utilizing the transformation parameters; and generate a continuously updated amalgamated image comprising at least a portion of an image scope of the transformed and aligned video image feed overlaid over at least one of the selected still images such that the portion of the image scope of the transformed and aligned video image feed is equivalent to an image scope of that portion of the least one of the selected still images over which the transformed and aligned video image feed is overlaid.

8. A computing device comprising:
   one or more processing units; and
   one or more computer-readable storage media comprising computer-executable instructions which, when executed by the one or more processing units, cause the computing device to:
   transform and align a video image feed, while it is being received, utilizing transformation parameters; and
   generate a continuously updated amalgamated image comprising at least a portion of an image scope of the transformed and aligned video image feed overlaid over at least one pre-existing still image, which was selected based on location metadata associated with both the video image feed and the at least one pre-existing still image, such that the portion of the image scope of the transformed and aligned video image feed is equivalent to an image scope of that portion of the least one pre-existing still image over which the transformed and aligned video image feed is overlaid, wherein the transformed and aligned video image feed comprises image features having a visual size and appearance equivalent to that of corresponding images features in the least one pre-existing still image;

wherein the transformation parameters are derived based on image features in an average image that are along a motion mask, the image features having corresponding image features in the at least one pre-existing still image, wherein the average image comprises those elements that remain static throughout a sample of the video image feed, and wherein further the motion mask identifies areas in which elements move through the sample of the video image feed.

9. The computing device of claim 8, wherein the video image feed is from a traffic camera and wherein further the at least one pre-existing still image is a panorama.

10. The computing device of claim 9, wherein the computer-executable instructions for generating the amalgamated image comprise computer-executable instructions for: filtering out portions of the video image feed other than a roadway and vehicular traffic thereon and overlaying only the roadway and the vehicular traffic onto the at least one pre-existing still image.

11. The computing device of claim 8, wherein the computer-executable instructions for generating the amalgamated image comprise computer-executable instructions for: filtering out static image elements from the video image feed and overlaying only moving image elements from the video image feed onto the at least one pre-existing still image.

12. The computing device of claim 8, wherein the at least one pre-existing still image has associated with it location metadata identifying a location proximate to a location identified by location metadata associated with the video image feed.

13. A method for generating an amalgamated image comprising a video image feed visually integrated into a pre-existing still image, the method comprising the steps of:
   obtaining a sample of the video image feed;
   selecting the pre-existing still image based upon its image scope comprising at least a portion of an image scope of the obtained sample of the video image feed, the selecting being informed by location metadata associated with both the video image feed and the still image;
   deriving an average image comprising those elements that remain static throughout the sample of the video image feed;
   deriving a motion mask identifying areas in which elements move throughout the sample of the video image feed;
   identifying image features in the average image that are along the motion mask, having corresponding image features in the pre-existing still image; and
   deriving transformation parameters to transform and align the video image feed such that the identified image features in the sample of the video image feed, after transformation and alignment, have a visual size and appearance equivalent to that of the corresponding image features in the pre-existing still image and can be equivalently overlaid over the corresponding image features in the selected still image.

14. The method of claim 13, wherein the video image feed is from a traffic camera and wherein further the pre-existing still image is a map panorama utilized to provide a street-level view.

15. The method of claim 13, wherein identifying image features in the video image feed comprises identifying image features in the pre-existing still image that are along a roadway, associated with the pre-existing still image, along which a traffic camera is oriented, wherein the video image feed is from the traffic camera, and wherein the pre-existing still image is a panorama.

16. The method of claim 13, wherein the deriving the transformation parameters comprises: selecting a first set of image features from among the identified image features in the sample of the video image feed; deriving preliminary transformation parameters; transforming and aligning the sample of the video image feed with the derived preliminary transformation parameters; scoring an overall fit between the transformed and aligned sample of the video image feed and the selected still image, the scoring being based on an accuracy of alignment of others of the identified image features that are not part of the first set of image features; repeating the deriving and the scoring for subsequent sets of image features, selected from among the identified image features in the sample of the video image feed; and selecting, as the transformation parameters, those preliminary transformation parameters that yielded a best score of the overall fit.

17. The method of claim 13, wherein the identified image features are traffic lane marking lines and wherein further the deriving the transformation parameters comprises performing homography utilizing the traffic lane marking lines.

18. The method of claim 13, further comprising the steps of: stabilizing the sample of the video image feed into a composite with individual frames of the sample of the video image feed aligned with one another such that common image elements of each frame overlap.

19. The computing device of claim 8, wherein the generating the continuously updated amalgamated image comprises generating the continuously updated amalgamated image as part of a street-level view presented through a map-based website.

20. The method of claim 13, further comprising the steps of: transforming and aligning the video image feed while it is being received utilizing the transformation parameters; and generating a continuously updated amalgamated image comprising at least a portion of an image scope of the transformed and aligned video image feed overlaid over at least one of the selected still images such that the portion of the image scope of the transformed and aligned video image feed is equivalent to an image scope of that portion of the least one of the selected still images over which the transformed and aligned video image feed is overlaid.

* * * * *